US006422354B1

(12) United States Patent
Shaw et al.

(10) Patent No.: US 6,422,354 B1
(45) Date of Patent: Jul. 23, 2002

(54) DISC BRAKE CALIPER WITH INTEGRAL PARKING BRAKE

(75) Inventors: Schuyler Scott Shaw, Dayton; John Benjamin Hageman, Vandalia, both of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/746,326

(22) Filed: Dec. 21, 2000

(51) Int. Cl.[7] .......................... F16D 55/08; F16D 55/16
(52) U.S. Cl. ................. 188/72.8; 188/72.9; 188/196 V; 188/196 D
(58) Field of Search ................. 188/72.1, 72.6, 188/72.7, 72.8, 72.9, 196 V, 196 BA, 196 B, 196 D

(56) References Cited

U.S. PATENT DOCUMENTS

| 3,788,430 A | * | 1/1974 | Hurt ........................... 188/72.6 |
| 3,991,859 A | * | 11/1976 | Coulter et al. ............. 188/71.9 |
| 4,022,300 A | * | 5/1977 | Afanador et al. .......... 188/72.1 |
| 4,061,208 A | * | 12/1977 | Nishiyama ................. 188/71.9 |
| 4,620,617 A | * | 11/1986 | Weber ........................ 188/71.9 |

FOREIGN PATENT DOCUMENTS

DE          3405027 A1 *  8/1985

* cited by examiner

Primary Examiner—Paul N. Dickson
Assistant Examiner—Robert A. Siconolfi
(74) Attorney, Agent, or Firm—Scott A. McBain

(57) ABSTRACT

A disc brake caliper with an integral parking brake includes a caliper housing defining a cavity therein and a piston axially translatable within the cavity and having an internal bearing surface. At least one brake pad is affixed to either the piston or the caliper housing. A parking brake mechanism is mounted within the cavity and is interposed between a portion of the housing and the piston. The parking brake mechanism includes a thrust pin substantially axially aligned with the piston and rotatable within the housing. A first radial clutch is engageable with the thrust pin, and a second axial clutch is operable upon the piston. Rotation of the thrust pin in a first direction causes engagement of the first radial clutch and of the second axial clutch causing axial displacement of the piston. Rotation of the thrust pin in an opposite direction causes disengagement of the first and said second clutches.

20 Claims, 4 Drawing Sheets

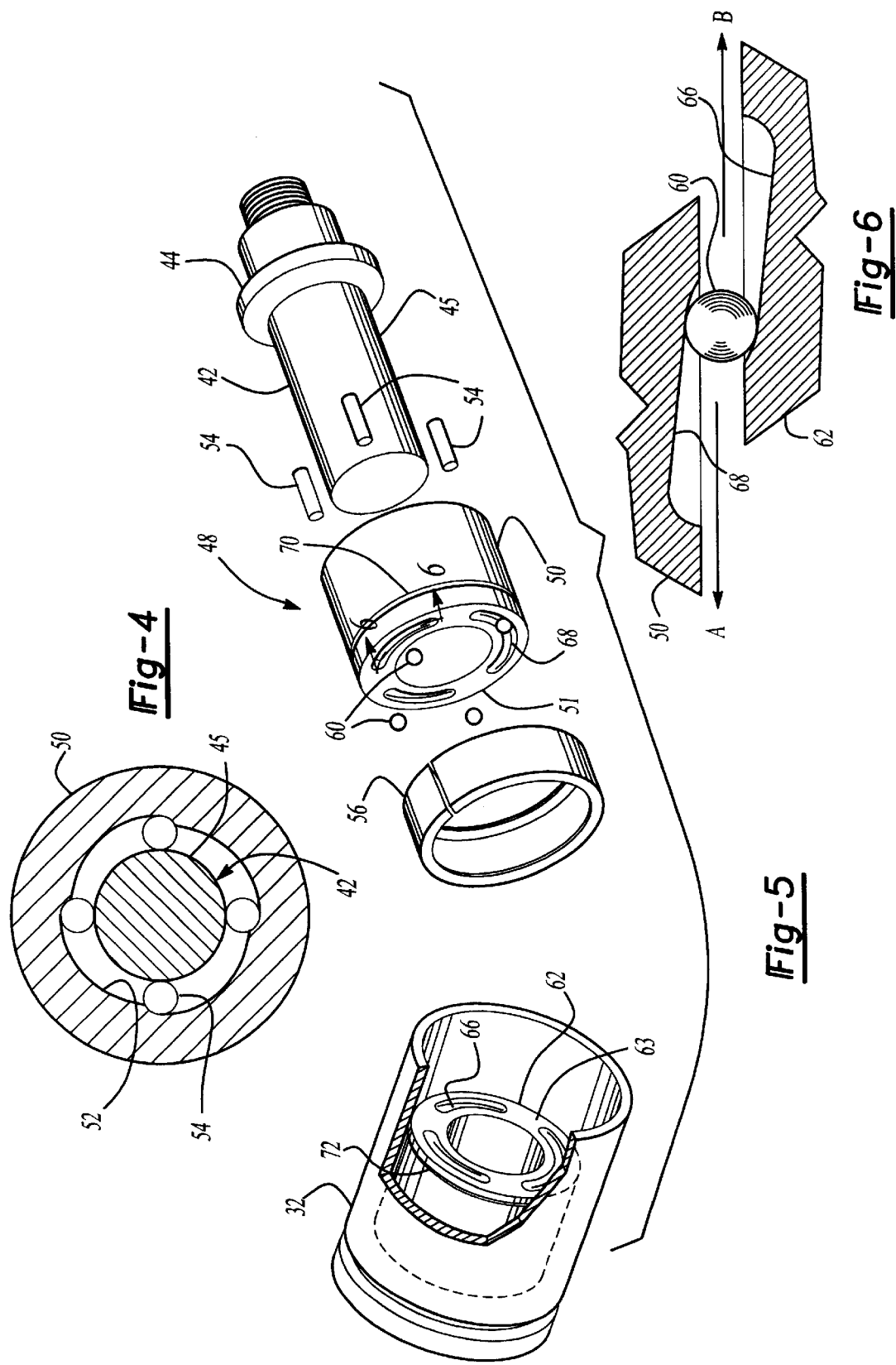

DISC BRAKE CALIPER WITH INTEGRAL PARKING BRAKE

TECHNICAL FIELD

The present invention relates to vehicle brakes, and in particular, to a disc brake caliper integrating a parking brake therein.

BACKGROUND OF THE INVENTION

The present invention relates to vehicle brakes, and in particular, to a disc brake caliper integrating a parking brake therein.

A disc brake operates on the principal of hydraulically actuating a piston in a caliper to force opposing brake pads against parallel faces of a rotor attached to the rotating wheel. Such a configuration is generally shown in FIG. 1. It is also known in the art to incorporate a parking brake within the caliper, and such a prior art parking brake 90 is shown in FIG. 2. The prior art parking brake and caliper combination comprises a caliper housing 91 having an internal cavity 100 within which piston 92 is acted upon by brake fluid to translate piston 92 with respect to caliper housing 91. A threaded pin extends through caliper housing 91 and into cavity 100 and piston 92. The shaft of threaded pin 93 incorporates high-lead external threads 94 upon which is received a threaded sleeve 95 having mating high-lead internal threads. A roller clutch 96 is positioned around the exterior of threaded sleeve 95 such that when pin 93 is rotated by lever 99, the high-lead threads cause sleeve 95 to rotate with pin 93 until roller clutch engages an outer wall of sleeve 95 and an inner wall of piston 92 to rotationally lock in place sleeve 95 with respect to piston 92. Once sleeve 95 is rotationally locked in place with respect to piston 92, the high-lead threads 94 of pin 93 drive sleeve 95 and piston 96 to the left thereby forcing opposing brake pads against the brake rotor to prevent rotation of the wheel and thereby providing the parking brake function. Thrust washer 97 and retainer 98 maintain sleeve 95 in a relatively constant axial relationship with respect to piston 92. As the brake pads wear, piston 92 self adjusts to the left and thrust washer 97 correspondingly forces sleeve 95 to the left along the high-lead threads 94 of pin 93 when roller clutch 96 is disengaged.

Incorporation of this configuration for a parking brake in a disc brake caliper poses some problems such as the threads becoming worn or jammed with respect to each other. These problems can potentially result in the failure of the parking brake to engage or the failure of the parking brake to disengage. Additionally, the use of high-lead threads to induce the compression of the opposing brake pads upon the brake rotor is relatively inefficient thereby requiring a significant torquing force to be applied to pin 93 to affect the required force of the brake pads against the brake rotor. Thus, there is a need for a disc brake caliper incorporating an integrated parking brake of greater reliability that further requires a lower torquing force applied to the parking brake to affect the braking function.

SUMMARY OF THE INVENTION

One aspect of the present invention is a disc brake caliper with an integral parking brake. The caliper includes a caliper housing defining a cavity therein and a piston axially translatable within the cavity and having an internal bearing surface. At least one brake pad is affixed to either the piston or the caliper housing. A parking brake mechanism is mounted within the cavity and is interposed between a portion of the housing and the piston. The parking brake mechanism includes a thrust pin substantially axially aligned with the piston and rotatable within the housing. A first radial clutch is engageable with the thrust pin, and a second axial clutch is operable upon the piston. Rotation of the thrust pin in a first direction causes engagement of the first radial clutch and of the second axial clutch causing axial displacement of the piston. Rotation of the thrust pin in an opposite direction causes disengagement of the first and said second clutches.

Another aspect of the current invention is a parking brake mechanism for a disc brake caliper of the type having a caliper housing defining a piston cavity. The parking brake mechanism includes a piston defining a central cavity at one end thereof and further including a bearing surface. A thrust pin having a cylindrical shank at one end and a thrust shoulder at an opposite end has at least a portion of the shank received in the piston cavity. A first radial clutch extends about the thrust pin shank and is interposed between the piston and the thrust shoulder. A second axial clutch is operable by the radial clutch and is proximate to the piston-bearing surface.

These and other features, advantages and objects of the present invention will be further understood and appreciated by those skilled in the art by reference to the following specification, claims, and appended drawings.

BRIEF DESCRIPTION OF THE DRAWINGS

FIG. 4 is a cross-sectional view of the roller clutch taken along the lines 4—4 of FIG. 3.

FIG. 5 is an exploded clamshell perspective of the parking brake assembly within the disc brake caliper housing.

FIG. 6 is a cross-sectional view of the opposing ball ramps taken along line 6—6 of FIG. 5.

DESCRIPTION OF THE PREFERRED EMBODIMENT

Figure 3:
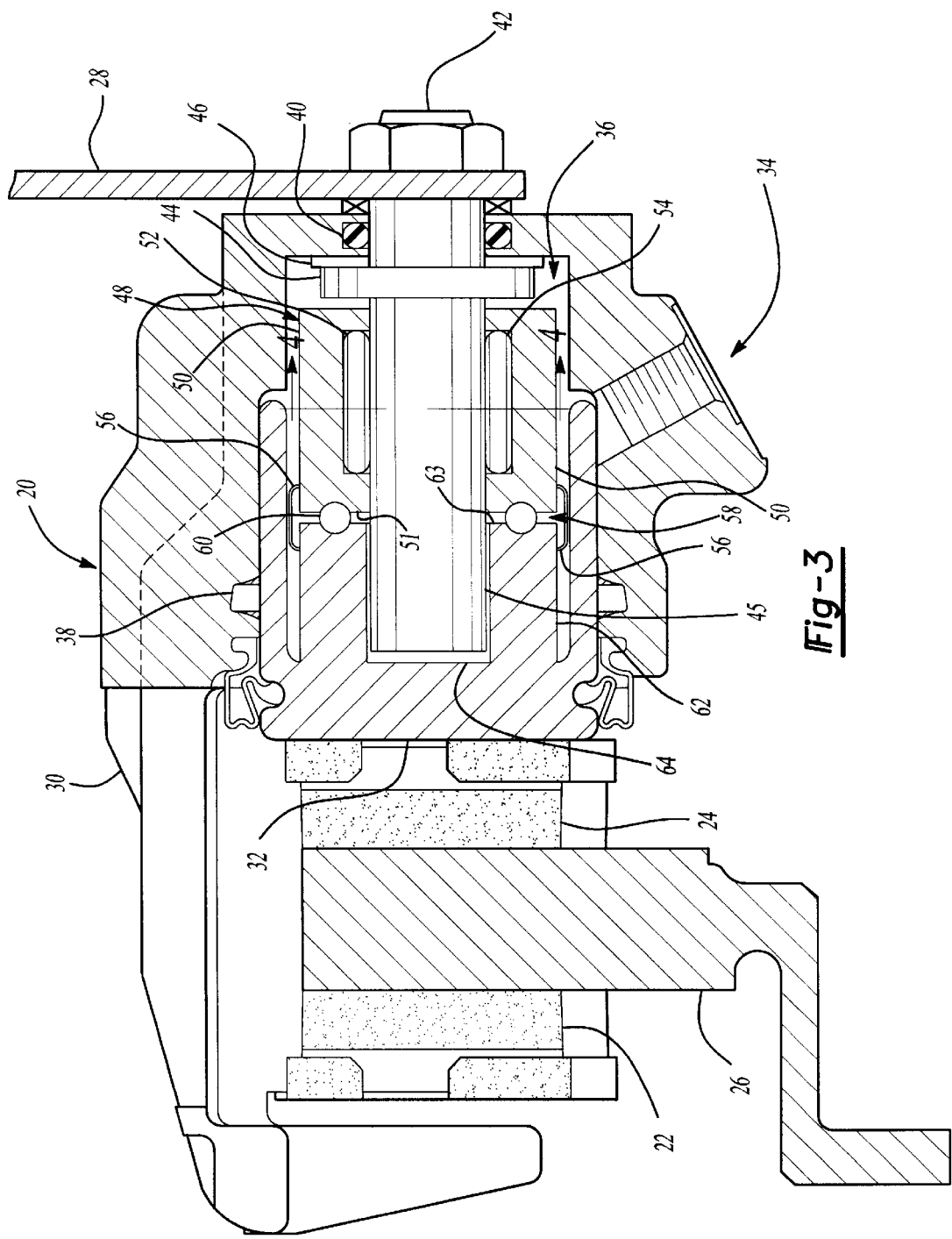
FIG. 3 is an elevational view of a disc brake caliper embodying an integral parking brake of the present invention.

For purposes of description herein, the terms "upper", "lower", "right", "left", "rear", "front", "vertical", "horizontal", and derivatives thereof shall relate to the invention as oriented in FIG. 3. However, it is to be understood that the invention may assume various orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
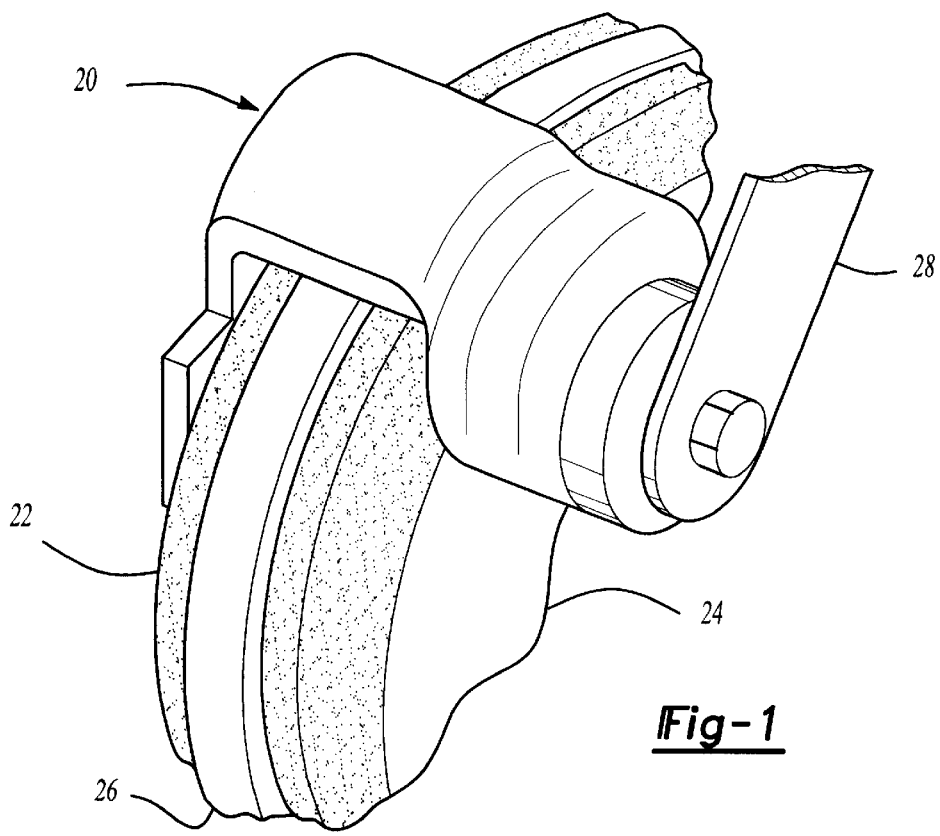
FIG. 1 is a perspective view of a disc brake caliper and disc pads in engagement with a brake rotor.
Figure 2:
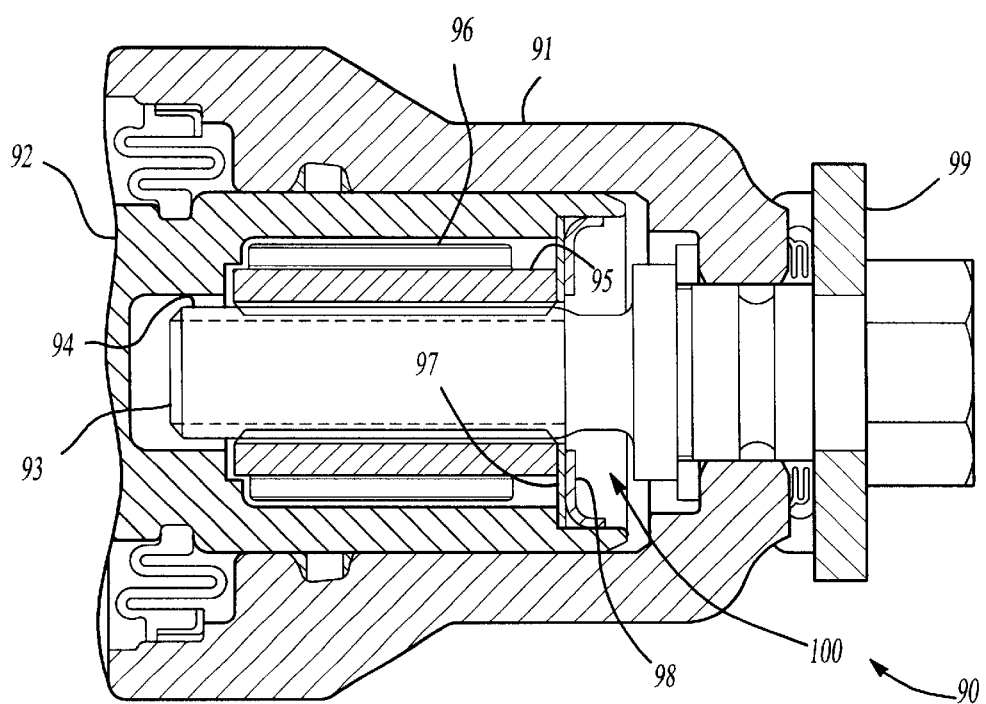
FIG. 2 is an elevational sectional view of a portion of the caliper showing a prior art parking brake utilizing high-lead threads.

Turning to the drawings, FIG. 1 shows a general perspective view of a disc brake showing a disc brake caliper 20 incorporating one of the preferred embodiments of the present invention and supporting opposing brake pads 22 and 24 against wheel brake rotor 26. Lever 28 provides mechanical actuation of the parking brake integral to caliper 20.

FIG. 3 discloses in elevation a partial section view of a brake caliper 20 incorporating one of the embodiments of the present invention illustrating the arrangement of the parking brake elements within caliper housing 30. Piston 32 is slideably engaged within cavity 36 of caliper housing 30. Piston 32 is axially translatable from left to right and right to left with the application of or release of pressurized brake fluid through brake fluid inlet 34. In normal operation, to activate the disc brake caliper 20, pressurized brake fluid is introduced from a brake master cylinder (not shown) at a different location on the vehicle and interconnected with the brake caliper by at least one fluid transmission line (also not shown) installed at inlet 34. When the brake system is depressurized, such as when the operator removes pressure from the brake pedal, the pressure in cavity 36 returns to ambient thereby releasing the pressure of brake pads 22 and 24 on rotor 26. As a safety measure, a parking brake mechanism is also integrated within cavity 36 of housing 30 to provide a safety back-up in case of failure of the brake fluid pressurization system or alternatively to be used to engage the brake pads 22 and 24 on rotor 26 when the vehicle is parked. Cavity 36 is sealed from the surrounding ambient pressure with piston seal 38 and thrust pin seal 40.

Thrust pin 42 extends from an exterior of caliper housing 30 into cavity 36. Pin 42 has attached to the end protruding from caliper housing 30, parking brake actuation lever 28 for providing a torquing force about a longitudinal axis of pin 42. Pin 42 includes an integral thrust shoulder 44 which bears upon a rightmost wall of cavity 36 through thrust bearing 46. Thrust bearing 46 can be of a relatively thin non-compressible, low friction material such as Teflon® or some other such low friction material. Pin 42 further includes a hardened shank 45 that extends into stud recess 64 in stud 62.

Stud 62 is affixed to the interior most portion of piston 32 or, alternatively, can be an integral unitary feature of piston 32. Immediately to the left of thrust shoulder 44 is roller clutch 48 that extends about the periphery of hardened shank 45. Roller clutch 48 is of a standard roller clutch design which is well known in the art and here comprises a clutch housing 50 including about an inner periphery a plurality of ramped recesses 52 as further shown in cross section in FIG. 4. A roller pin 54 is retained in each of the ramped recesses 52 such that when hardened shank 45 of thrust pin 42 is rotated counter-clockwise with respect to clutch housing 50 (as viewed in FIG. 4) rollers 54 begin rolling along ramp recesses 52. Pins 54 roll until they are snugly wedged between housing 50 and hardened shank 45 thereby inducing clutch housing 50 to also rotate in a counter-clockwise direction in concert with further counter-clockwise rotation of pin 42.

Turning now to FIG. 5, pin 42 and roller clutch 48 are shown in an exploded configuration. In the preferred embodiment, clutch housing 50 also includes three ramped thrust surfaces 68 equally spaced about clutch housing bearing face 51 at the left end of clutch housing 50. Clutch housing ramped thrust surfaces 68 partially receive therein one roller 60 within each ramp 68. Roller 60 can be either spherical or cylindrical and is referred to as ball 60 hereinafter. Those practiced in the art will understand that roller 60 in the shape of a cylinder can be accommodated by increasing the width or radial dimension of ramps 66 and 68 to accommodate the length of the cylinder. Thus, FIG. 6 is illustrative of both spherical and cylindrical rollers. Ramps 68 vary in depth from shallow at one end to a deeper dimension at an opposite end. The clutch housing bearing face 51 is retained proximate to the piston bearing face 63 of stud 62 in piston 32 by retainer 56. Retainer 56 is engaged in clutch housing retainer groove 70 and stud retainer groove 72 and is constructed such that retainer 56 permits minor axial translation of clutch housing 50 with respect to stud 62. Piston bearing face 63 on stud 62 includes stud ramps 66 which are configured to receive a portion of balls 60 therein when retainer 56 retains clutch housing 50 in proximate axial position to stud 62.

Stud ramps 66 are oppositely configured from ramped thrust surfaces 68 in such a manner that when pin 42 is rotated to engage roller clutch 48, clutch housing 50 is rotated in like manner with respect to stud 62. As further shown in FIG. 6, when clutch housing 50 rotates in direction A with respect to stud 62 and stud 62 rotates in direction B with respect to clutch housing 50, ball 60 is rolled along respective ramped surfaces 66 and 68. This respective rotation causes ball 60 to roll to the shallow portions of ramps 66 and 68, thereby mechanically forcing piston 32 axially to the left. Such axial translation of piston 32 then applies the desired clamping force to brake pads 22 and 24 to provide a braking force to brake rotor 26.

As brake pads 22 and 24 begin to wear and become thinner, piston 32 axially adjusts within cavity 36 to maintain brake pads 22 and 24 in a desired spatial relationship proximate to rotor 26 to minimize pad travel when braking is desired. As the self-adjustment feature of piston 32 translates to the left within cavity 36, retainer 56, by reason of its engagement in grooves 70 and 72, also translates roller clutch 48 along hardened shank 45. The axial translation of roller clutch 48 along shank 45 over time does not affect the operation of roller clutch 48 because the outer periphery of shank 45 is diametrically uniform along the entire shank.

Figure 7:
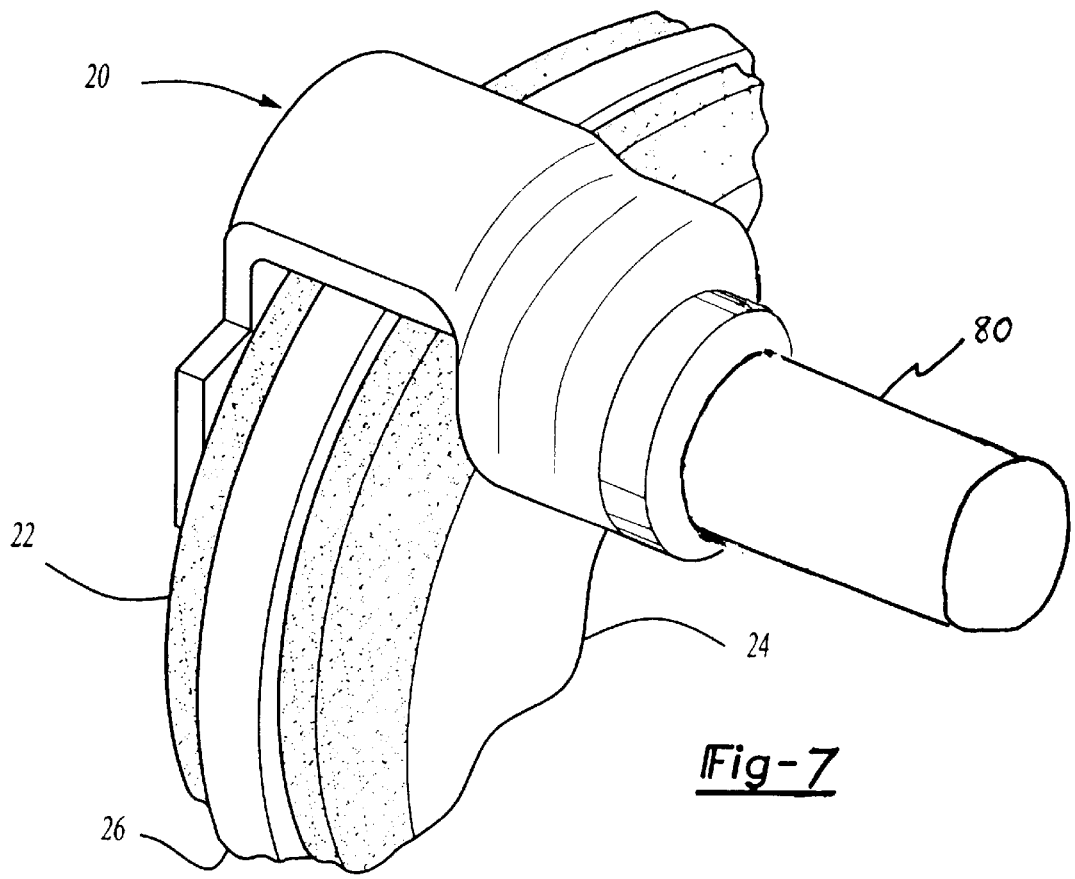
FIG. 7 is a perspective view of a disc brake caliper and disc pads in engagement with a brake rotor actuated by an electric motor.

Actuation lever 28 is typically activated through a mechanical linkage to a control accessible to the vehicle operator. Alternatively, an electric motor and gearbox 80 (FIG. 7) can be coupled to pin 42 (FIG. 3) where pin 42 exits caliper housing 30 to transfer the rotary motion of the electric motor to the necessary torque required to actuate the parking brake. Such electric motors and gearboxes are well known in the art and the coupling of such an electric motor and gearbox are well within the skill of one practiced in the art. Ideally, the chosen gearbox interfacing between the motor and pin 42 is constructed such that the back drive efficiency of the gearbox is less than 50% meaning that a reverse torque applied to pin 42 from the braking resistance of the wheels is insufficient to induce a reverse operation of the gearbox and electric motor until the electric motor is selectively reversed.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principals of patent law, including the doctrine of equivalents.

What is claimed is:

1. A disc brake caliper with an integral parking brake, said caliper comprising:
   a caliper housing defining a cavity;
   a piston defining an internal recess and having an internal bearing surface therearound, said piston being axially translatable within said cavity;
   at least one brake pad affixed to either of said piston or said housing; and
   a parking brake mechanism within said cavity and interposed between a portion of said housing and said piston, said parking brake mechanism including:
   a thrust pin substantially axially aligned with said piston and rotatable within said housing, said thrust pin having one end thereof received in said piston internal recess, said one end of said thrust pin freely movable with respect to said piston and not bearing thereupon;
   a first radial clutch engagable with said thrust pin; and
   a second axial clutch operable upon said internal bearing surface of said piston wherein rotation of said thrust pin in a first direction causes engagement of said first radial clutch and said second axial clutch causing axial displacement of said piston, and rotation of said thrust pin in an opposite direction causes disengagement of said first and said second clutches.

2. The disc brake caliper according to claim 1 wherein said first radial clutch comprises:
   a cannular clutch housing defining a plurality of ramped clutch surfaces about an inner circumference; and
   a plurality of roller pins, each of said plurality of pins associated with one of said ramped clutch surfaces wherein said rotation of said thrust pin in said first direction causes said roller pins to become wedged against said thrust pin and rotation of said clutch housing, and rotation of said thrust pin in said second direction causes said disengagement of said first clutch and permits axial movement of said first clutch along said thrust pin.

3. The disc brake caliper according to claim 2 wherein said second axial clutch comprises:
   a clutch bearing face in opposition to said piston internal bearing surface and proximate thereto, said clutch bearing face defining a plurality of ramped thrust surfaces;
   a plurality of rollers captured between said thrust bearing face and said piston internal bearing surface, one of said plurality of rollers associated with one of said plurality of said ramped thrust surfaces.

4. The disc brake caliper according to claim 3 wherein said rollers are spherically shaped.

5. The disc brake caliper according to claim 3 wherein said rollers are cylindrically shaped.

6. The disc brake caliper according to claim 3 wherein said clutch bearing face comprises a portion of said radial clutch housing.

7. The disc brake caliper according to claim 6 wherein said thrust bearing face and said piston internal bearing surface are substantially perpendicular to a longitudinal axis of said thrust pin.

8. The disc brake caliper according to claim 7 further including a retainer maintaining said radial clutch housing proximate to said piston internal bearing surface.

9. The disc brake caliper according to claim 8 wherein said thrust pin includes a thrust shoulder, said thrust shoulder bearing on a portion of said caliper housing axially opposite from said piston.

10. The disc brake caliper according to claim 9 further including a parking brake actuator and wherein said actuator is operably attached to an end of said thrust pin, said thrust pin end extending from said caliper housing.

11. The disc brake caliper according to claim 10 wherein said parking brake actuator comprises a lever.

12. The disc brake caliper according to claim 11 wherein said parking brake actuator comprises an electric motor.

13. A parking brake mechanism for a disc brake caliper of the type having a caliper housing defining a piston cavity, said parking brake mechanism comprising:
   a piston defining a central cavity at one end thereof and including a bearing surface;
   a thrust pin having a cylindrical shank at one end and a thrust shoulder at an opposite end, at least a portion of said shank received in said piston central cavity, said shank portion not engaged with said piston and further wherein said shank portion is freely movable within said piston central cavity;
   a first radial clutch about said thrust pin shank and interposed between said piston and said thrust shoulder; and
   an axial clutch operable by said radial clutch and proximate to said piston bearing surface.

14. The parking brake mechanism according to claim 13 wherein said first radial clutch comprises:
   a cannular clutch housing defining a plurality of ramped clutch surfaces about an inner circumference; and
   a plurality of roller pins, each of said plurality of pins associated with one of said ramped clutch surfaces wherein rotation of said thrust pin in a first direction causes said roller pins to become wedged against said thrust pin and further causes rotation of said clutch housing in the said first direction, and rotation of said thrust pin in a second direction causes disengagement of said first radial clutch and permits axial movement of said first clutch along said thrust pin.

15. The parking brake mechanism according to claim 14 wherein said second axial clutch comprises:
   a clutch bearing face in opposition to said piston internal bearing surface and proximate thereto, said clutch bearing face defining a plurality of ramped thrust surfaces;
   a plurality of rollers captured between said thrust bearing face and said piston internal bearing surface, one of said plurality of rollers associated with one of said plurality of said ramped thrust surfaces.

16. The parking brake mechanism according to claim 15 wherein said rollers are spherically shaped.

17. The parking brake mechanism according to claim 16 wherein said rollers are cylindrically shaped.

18. The disc brake caliper according to claim 17 wherein said thrust bearing face and said piston internal bearing surface are substantially perpendicular to a longitudinal axis of said thrust pin.

19. The disc brake caliper according to claim 18 further including a retainer maintaining said radial clutch housing proximate to said piston internal bearing surface.

20. A disc brake caliper with an integral parking brake, said caliper comprising:
   a caliper housing defining a cavity;
   a piston having an internal bearing surface and being axially translatable within said cavity;
   at least one brake pad affixed to either of said piston or said housing; and a parking brake mechanism within said cavity and interposed between a portion of said housing and said piston, said parking brake mechanism including:

a thrust pin substantially axially aligned with said piston and rotatable within said housing, a first radial clutch engagable with said thrust pin and wherein said first radial clutch is axially coupled to said piston such that when disengaged, axial movement of said piston with respect to said thrust pin substantially causes a like axial movement of said radial clutch with respect to said thrust pin; and a second axial clutch operable upon said piston wherein rotation of said thrust pin in a first direction causes engagement of said first radial clutch with said thrust pin and engagement of said second axial clutch with said piston thereby causing axial displacement of said piston, and further wherein rotation of said thrust pin in an opposite direction causes disengagement of said first and said second clutches.

* * * * *